July 6, 1954 R. S. ROOT 2,682,943
FRICTION CLUTCH WITH LEVER ASSEMBLY
Filed Dec. 7, 1950
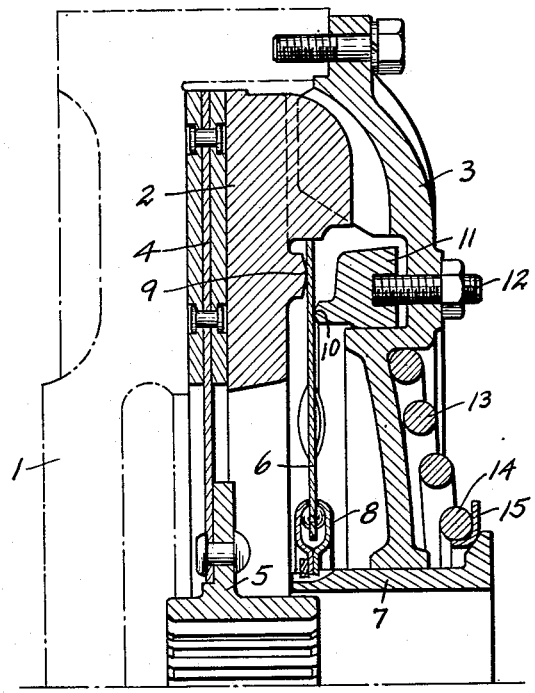
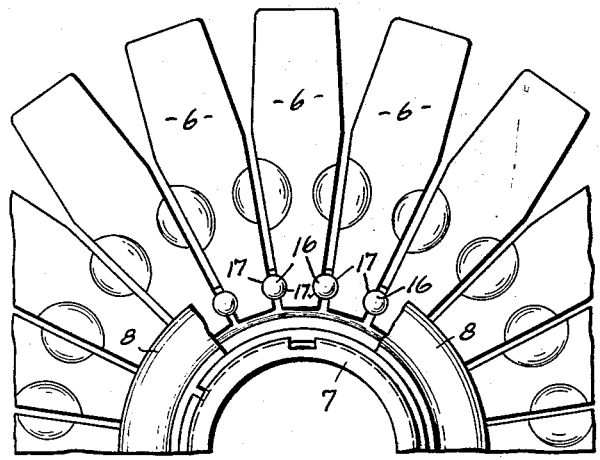
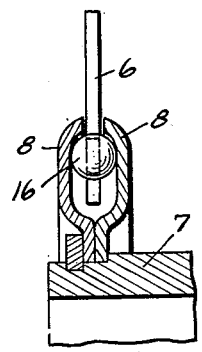
INVENTOR:
Robert S. Root,
BY
Bodell & Thompson
ATTORNEYS.

Patented July 6, 1954

2,682,943

UNITED STATES PATENT OFFICE 2,682,943

FRICTION CLUTCH WITH LEVER ASSEMBLY

Robert S. Root, Syracuse, N. Y., assignor to Lipe-Rollway Corporation, Syracuse, N. Y., a corporation of New York Application December 7, 1950, Serial No. 199,594

2 Claims. (Cl. 192—99)

This invention relates to friction clutches of the type adapted for use in motor vehicles, which clutches include driving and driven members, a pressure ring rotatable with the driving member and pressing against one side of the driven member to compress the driven member between it and the driving member, a throw-out mechanism which includes a throw-out sleeve or collar and radial motion transmitting and multiplying levers between the throw-out collar and the pressure ring and slidably pressing on the pressure ring, and also slidably engaging a fulcrum on the back plate of the clutch construction, and clutch spring means loaded to normally act through the levers on the throw-out collar to hold the clutch engaged. The levers are usually spatulate in form and are located in an annular series side by side although insofar as this invention is concerned it is not necessary that the levers touch each other along their side edges.

One of the objects of the invention is means anchoring the levers at their inner ends to the throw-out collar so that the levers are held by the anchoring means from lateral swinging or pivotal movement, thus avoiding swinging of the levers in either direction circumferentially and hence, avoiding lateral displacement of the levers and tingling or rattling thereof during the operation of the clutch, especially when the clutch is disengaged.

More specifically, it has for its object an anchoring means whereby any lateral or circumferential pivotal movement of the levers is neutralized and the levers held in almost exact radial lines.

More specifically, it has for its object anchoring members between the inner ends of the levers and pivotally connecting the levers at their inner ends, the anchoring means being located at the opposite side edges of each lever on opposite sides of the radial medial line of the lever and being common to the adjacent levers on opposite sides of each lever so that any outward throw under the centrifugal force of each lever is balanced by the centrifugal force of the adjacent levers. Heretofore, each lever has been anchored to the throw-out collar by a single ball carried in a socket in the inner end of each lever, the ball being located in the radial medial line of the lever and the balls being individual to the levers so that the levers are free to have a lateral swinging or chucking movement in a circumferential direction. This movement sometimes results in a lateral or circumferential displacement of the levers relatively to each other, and also results in a clanking or tingling of the levers during the operation of the clutch.

The invention is here shown as embodied in a conventional type of clutch.

The invention consists in the novel features and in the combinations and constructions hereinafter set forth and claimed.

In describing this invention, reference is had to the accompanying drawings in which like characters designate corresponding parts in all the views.

Figure 1 is a fragmentary radial sectional view of a clutch embodying this invention.

Figure 2 is a fragmentary rear elevation, partly broken away, of an assembly of levers and the throw-out sleeve or collar.

Figure 3 is a fragmentary sectional view of the assembly of the annular coupling device of the throw-out sleeve or collar in which device the inner ends of the levers are anchored.

1 designates the driving member of the clutch which is usually the flywheel of the internal combustion engine of the vehicle.

2 is the pressure ring rotatable with the driving member 1, and 3 the back plate bolted to and rotatable with the driving member.

4 is the driven member which extends between the pressure ring 2 and an opposing surface at the bottom of a recess in the driving member or flywheel 1. The driven member 4 is a disk or plate mounted on a hub 5 which is splined on the clutch shaft which is mounted in axial alinement with the driving member. The hub is splined on the clutch shaft to have a slight shifting movement axially.

6 designates an annular series of motion transmitting and multiplying levers extending radially relatively to the throw-out collar 7 which is shiftable axially of the clutch shaft by the usual throw-out lever or pedal. The levers are spatulate in form.

The levers are anchored at their inner ends in a channel shaped coupling device 8 forming part of the throw-out sleeve 7 and slidably engage toward their outer ends on a fulcrum 9 on the rear side of the pressure ring 2, and also slidably engage a fulcrum at 10 on a fulcrum ring 11 supported from the back plate. As here shown, the ring 11 is adjustable axially of the back plate, as by screws 12, to take up wear on the friction faces of the clutch.

The spring means of the clutch is here shown as a coiled conical spring 13 pressing at its larger end against the outer face of the back plate and at its smaller or rear end 14 against a seat on an annular flange 15 at the rear end of the throw-out sleeve 7. The levers 6 extend into the channel of the coupling 8 and are anchored therein. It is the anchoring means and its arrangement that constitutes the subject matter of this invention.

The anchoring means comprises members interposed between the inner ends of the levers and common to adjacent levers and located on opposite sides of the radial medial lines of the levers. As here shown, the anchoring means comprises balls 16 held in sockets 17 formed partly in the side edges of each lever on opposite sides of the radial medial line of the lever and also seated partly in similar sockets in the adjacent levers so that each lever and the adjacent levers have balls in common. The balls thus pivotally permit the levers to move in their normal operation and also to pivotally connect each lever and the adjacent levers. Hence, the centrifugal force on any one lever tending to tilt the lever circumferentially is transferred to the adjacent lever radially inward so that the levers themselves are held exactly in a radial line and do not tilt laterally or circumferentially in one direction or the other. As any force tending to tilt the levers out of radial line would tend to move one side of the lever up about one of the balls and the other side edge downward, the downward movement would be opposed and balanced by the other ball and the adjacent lever. The only direction the levers can shift is in an exact radial line midway between the balls. Hence, there is no rattling of the levers and hence, the outer end edges of the levers are always held in a circumferential line and the corners of the levers do not dig into any surface, as the inner face of the annular flange 18 here shown as provided on the rear side of the pressure ring and also as the levers are held in a radial line, the levers do not shift, and grooves do not become worn therein by the fulcrum 9 or 10. Also, the levers may be spaced farther apart at their side edges than at the inner ends of the levers where the balls are located. Also, because of the location of the balls relatively to the levers and the balls being common to adjacent levers, radial shifting of the levers is also prevented.

What I claim is:

1. A friction clutch of the class described comprising driving and driven members, a pressure ring rotatable with the driving member, the driven member extending between the pressure ring and the driving member, a back plate rotatable with the driving member, throw-out mechanism comprising a throw-out collar and radial levers operated thereby slidably pressing on the pressure ring and slidably fulcrumed on a fulcrum carried by the back plate, and clutch spring means acting on the throw-out collar and loaded to engage the clutch; the clutch construction being characterized by the clutch levers being pivotally anchored at their inner ends against radial displacement to the throw-out collar by members between the levers, the anchoring members comprising balls between the levers and located between the side edges at the inner end of each lever and the side edges of adjacent levers, said balls being seated in sockets formed partly in each lever and the adjacent levers and on opposite sides of the radial medial lines of the levers.

2. A friction clutch of the class described comprising driving and driven members, a pressure ring rotatable with the driving member, the driven member extending between the pressure ring and the driving member, a back plate rotatable with the driving member, throw-out mechanism comprising a throw-out collar and radial levers operated thereby slidably pressing on the pressure ring and slidably fulcrumed on a fulcrum carried by the back plate, and clutch spring means acting on the throw-out collar and loaded to engage the clutch; the clutch construction being characterized by the levers being formed with notches in their opposite side edges in proximity to the inner ends thereof, an annular series of anchoring members interlocked with said throw-out collar for pivotally connecting the inner end of each lever to said collar, said anchoring members being interposed respectively between said levers and positioned in the notches thereof.

References Cited in the file of this patent
UNITED STATES PATENTS

| Number | Name | Date |
| --- | --- | --- |
| 2,064,500 | Spase | Dec. 15, 1936 |
| 2,117,482 | Klix | May 17, 1938 |